United States Patent [19]

Kulich et al.

[11] Patent Number: 5,559,172
[45] Date of Patent: Sep. 24, 1996

[54] VINYL AROMATIC RESIN COMPOSITIONS CONTAINING CONDENSATION PRODUCT OF HALOGENATED AROMATIC DIOL AND AN ALKYLENE DIHALIDE

[75] Inventors: Donald M. Kulich, Marietta, Ohio; Thomas B. Cleveland, Parkersburg, W. Va.; Enrico J. Termine, West Lafayette; Arthur G. Mack, Lafayette, both of Ind.

[73] Assignee: General Electric Company, Pittsfield, Mass.

[21] Appl. No.: 439,014

[22] Filed: May 11, 1995

[51] Int. Cl.$^6$ .............................. C08K 5/06; C08K 5/36; C08K 5/02
[52] U.S. Cl. .................... 524/155; 524/167; 524/373; 524/411; 524/412
[58] Field of Search ........................... 524/373, 411, 524/412, 155, 167

[56] References Cited

U.S. PATENT DOCUMENTS

| | | | |
|---|---|---|---|
| 4,032,508 | 6/1977 | Anderson | 524/373 |
| 5,414,046 | 5/1995 | Davis | 525/132 |
| 5,420,183 | 5/1995 | Arena et al. | 524/373 |

*Primary Examiner*—Kriellion S. Morgan

[57] ABSTRACT

A flame retardant thermoplastic composition is provided containing a vinyl aromatic resin and a flame retardant. The flame retardant is an oligomeric condensation product of a halogenated aromatic diol and an alkylene dihalide composition which is preferably an admixture of an alkyl monohalide and an alkylene dihalide. The compositions are useful for making molded articles for automotive parts and for business machine housings. The composition exhibit no bloom, good thermal color stability, and good resistance to ultraviolet light.

27 Claims, No Drawings

VINYL AROMATIC RESIN COMPOSITIONS CONTAINING CONDENSATION PRODUCT OF HALOGENATED AROMATIC DIOL AND AN ALKYLENE DIHALIDE

BACKGROUND OF THE INVENTION

1. Field of the Invention

The present invention relates to vinyl aromatic resin compositions and more particularly flame retardant vinyl aromatic resin compositions.

2. Description of the Related Art

Brominated flame retardants and their use to flame retard vinyl aromatic resins such as acrylonitrile-butadiene-styrene (ABS) graft copolymers are generally known. More specifically, the use of brominated bisphenol A in ABS graft copolymer compositions is known. Such flame retarded compositions, however, typically suffer from one or more of the following deficiencies as the result of incorporating the flame retardant, namely, (a) poor ultraviolet light stability, (b) poor thermal color stability, (c) tendency to bloom, (d) low heat distortion temperature, (e) tendency to char, (f) low impact strength and/or poor melt flow (high viscosity). Additionally, various previously known compounds contained reactive groups which could undesirably lead to degradation of the thermoplastic resin.

Consequently, there is a need to provide a flame retardant vinyl aromatic resin composition overcoming one or more of the above deficiencies, and more particularly exhibiting in combination (a) no bloom, (b) good ultraviolet light stability, (c) thermal stability, (d) suitable levels of heat distortion temperature, impact strength and melt flow (sufficiently low viscosity), and (e) minimal degradation of the thermoplastic resin.

SUMMARY OF THE INVENTION

The present invention involves a vinyl aromatic resin composition containing an amount of a condensation product of a halogenated aromatic diol and an alkylene dihalide. The condensation product is in the form of oligomers, generally halogenated polyethers, and is included in the composition in amounts sufficient to enhance flame retardancy of the composition. The product is preferably free of reactive end groups. The compositions are useful for making flame retarded thermoplastic molded articles such as automotive parts and business machine housings.

DETAILED DESCRIPTION OF THE INVENTION

The compositions of the present invention contain (a) vinyl aromatic resin, and (b) a flame retardant. The vinyl aromatic thermoplastic resin is preferably present in the composition at a level of from 50 to 95 percent by weight based on the total weight of the composition, more preferably from 60 to 90 percent by weight thereof, and most preferably from 70 to 80 percent by weight thereof. Suitable vinyl aromatic resins include styrenic resins such as polystyrene, poly($\alpha$-methylstyrene); impact polystyrene, styrene-acrylonitrile copolymers, and vinyl aromatic graft copolymers such as acrylonitrile-butadiene-styrene (ABS) graft copolymers. The compositions may also contain amounts of another thermoplastic resin such as an aromatic polycarbonate resin, a polyester resin, a polyphenylene ether resin or blends thereof, wherein the vinyl aromatic resin is present at a level of from 5 to 90 percent by weight of the composition, more preferably from 20 to 80 percent by weight thereof, and the aromatic polycarbonate, polyester and/or polyphenylene ether resin is present at a level of from 5 to 90 percent by weight based on the total weight of the composition, and more preferably 20 to 80 percent by weight thereof.

The aromatic carbonate resins of the instant invention include the polycarbonate resins and the copolyester-carbonate resins. The polycarbonate resins are conventional and well known thermoplastic resins which are generally commercially available or may be readily prepared by known methods. These polycarbonates, as well as methods for their preparation, are described, inter alia, in U.S. Pat. Nos. 3,161,615; 3,220,973; 3,312,659; 3,312,660; 3,313,777; 3,666,614 and 3,393,672, all of which are incorporated herein by reference. The polycarbonates may be prepared by a variety of known methods, including the interfacial polymerization process which involves the coreaction of at least one dihydric phenol and a carbonate precursor. The polycarbonate resins contain at least one recurring structural unit represented by the general formula

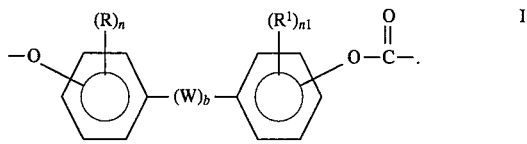

wherein:

R and $R^1$ are independently selected from monovalent hydrocarbon radicals, monovalent hydrocarbonoxy radicals, and halogen radicals;

W is selected from divalent hydrocarbon radicals,

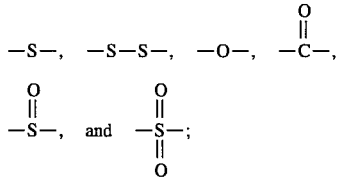

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, biphenyl, and naphthyl. The preferred aralkyl and alkaryl radicals are those containing from 7 to about 14 carbon atoms.

The preferred halogen radicals represented by R and $R^1$ are chlorine and bromine.

The monovalent hydrocarbonoxy radicals represented by R and $R^1$ may be represented by the formula —OR' wherein R' is a monovalent hydrocarbon radical of the type described hereinafore. Preferred hydrocarbonoxy radicals are the alkoxy and aryloxy radicals.

The divalent hydrocarbon radicals represented by W include the alkylene, alkylidene, cycloalkylene, and cycloalkylidene radicals. The preferred alkylene radicals are those containing from 2 to about 20 carbon atoms. The preferred alkylidene radicals are those containing from 1 to about 20 carbon atoms. The preferred cycloalkylene and cycloalkylidene radicals are those containing from 6 to about 16 ring carbon atoms.

Typically, the dihydric phenols utilized in the preparation of the polycarbonate resins may be represented by the general formula

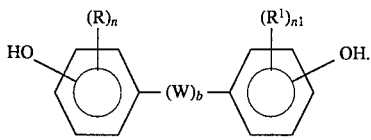

wherein R, $R^1$, n, $n^1$, W and b are as defined hereinafore.

Some illustrative non-limiting examples of dihydric phenols falling within the scope of Formula II include 2,2-bis(4-hydroxyphenyl) propane (bisphenol-A); 2,2-bis(3,5-dibromo-4-hydroxyphenyl) propane; 2,2-bis(3,5-dimethyl-4-hydroxyphenyl) propane; 2,2-bis(3-bromo-5-methyl-4-hydroxyphenyl) propane; 1,1-bis(4-hydroxyphenyl) cyclohexane; 1,1-bis(4-hydroxyphenyl) cyclododecane; 1,1-bis(3,5-dimethyl-4-hydroxyphenyl) cyclododecane; 1,1-bis(4-hydroxyphenyl) decane; 1,4-bis(4-hydroxyphenyl) butane; bis(4-hydroxyphenyl) methane; 4,4'-thiodiphenol; and bis(4-hydroxyphenyl) ether.

Other phenols which are useful are described in U.S. Pat. Nos. 2,998,835, 3,028,365 and 3,334,154, all of which are incorporated herein by reference.

The carbonate precursor may be a carbonyl halide, a carbonate ester, or a bishaloformate. The carbonyl halides may be carbonyl bromide, carbonyl chloride, or mixtures thereof. The carbonate esters may be diphenyl carbonate; di(halophenyl) carbonates such as di(-bromophenyl) carbonate, di(chlorophenyl) carbonate, and di(tribromophenyl) carbonate; di(alkylphenyl) carbonates such as di(tolyl) carbonate; di(naphthyl) carbonate; chlorophenyl chloronaphthyl carbonate; and phenyl tolyl carbonate. The bishaloformates that can be used include the bishaloformates of dihydric phenols such as the bischloroformates of bisphenol-A and hydroquinone; and the bishaloformates of glycols such as the bischloroformates of ethylene glycol, neopentyl glycol, and polyethylene glycol. The preferred carbonate precursor is carbonyl chloride, also known as phosgene.

Among the processes used for the preparation of the polycarbonates are the pyridine process, the interfacial polymerization process, transesterification, and melt polymerization. A convenient process for the preparation of the polycarbonate resins is the interfacial polymerization process. This process utilizes two different solvent media which are immiscible. One solvent medium is an aqueous basic medium. The other solvent medium is an organic medium such as methylene chloride which is immiscible with said aqueous medium. Also employed in the interfacial polymerization process are molecular weight regulators which control the chain length or molecular weight of the polycarbonate by a chain terminating mechanism, and catalysts. The molecular weight regulators are well known in the art and include, but are not limited to, phenyl itself, p-tertiarybutyl phenol, and chroman-I. The catalysts are also well known in the art and include, but are not limited to, tertiary amines such as triethylamine, quaternary ammonium compounds such as tetraethylammonium bromide, and quaternary phosphonium compounds such as n-butyltriphenyl phosphonium.

Also included within the scope of the term polycarbonates are the randomly branched thermoplastic polycarbonates wherein a branching agent, which is generally a polyfunctional aromatic compound, is reacted with a dihydric phenol and the carbonate precursor. These polyfunctional aromatic compounds are used in minor amounts, i.e., amount effective to provide branching, and contain at least three functional groups which may be carboxyl, hydroxyl, carboxylic anhydride, haloformyl, and mixtures thereof. Some illustrative non-limiting examples of these aromatic polyfunctional compounds which may be employed as branching agents include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, and benzophenonetetracarboxylic acid.

The copolyester-carbonate resins are well known in the art and are described along with methods for their preparation in U.S. Pat. Nos. 3,169,121; 4,238,596; 4,156,069 and 4,238,597, all of which are incorporated herein by reference.

Briefly stated the high molecular weight thermoplastic aromatic copolyester-carbonates comprise recurring carbonate groups, carboxylate groups, and aromatic carbocylic groups in the polymer chain in which at least some of the carbonate groups and at least some of the carboxylate groups are bonded directly to the ring carbon atoms of the aromatic carbocyclic groups. These copolyester-carbonates contain ester bonds and carbonate bonds in the chain, wherein the amount of the ester bonds is in the range of from about 25 to about 90 mole percent, preferably from about 35 to about 80 mole percent. For example, 5 moles of bisphenol-A reacting completely with 4 moles of isophthaloyl dichloride and one mole of phosgene would give a copolyester-carbonate of 80 mole percent ester bonds.

These copolyester-carbonates may be readily prepared by the interfacial polymerization process by the reaction of (i) at least one dihydric phenol, (ii) a carbonate precursor, and (iii) an ester precursor. The dihydric phenols and the carbonate precursors are of the type described hereinafore. The ester precursor may be a difunctional carboxylic acid or, preferably, its ester forming reactive derivative such as an acid dihalide, e.g., isophthaloyl dichloride, terephthaloyl dichloride, and mixtures thereof. Some useful difunctional acids are set forth in U.S. Pat. No. 3,169,121. The polyesters may be either aliphatic aromatic, or aliphatic-aromatic in character. The polyesters are characterized in that they have recurring ester units in the polymer chain, i.e., carboxylate groups bonded to a carbon atom of a hydrocarbon or substituted hydrocarbon radical.

The preferred polyesters for use in the instant invention generally contain at least one recurring structural unit represented by the general formula:

wherein $R^2$ and $R^3$ are independently selected from divalent hydrocarbon radicals or substituted divalent hydrocarbon radicals.

In the case of aliphatic polyesters both $R^2$ and $R^3$ are independently selected from divalent aliphatic hydrocarbon radicals or substituted divalent aliphatic hydrocarbon radicals. The divalent aliphatic hydrocarbon radicals include the alkylene, alkenylene, alkylidene, cycloalkylene, cycloalkylidene, and cycloalkenylene radicals. Preferred alkylene radicals are those containing from 2 to about 20 carbon atoms. The preferred alkylidene radicals are those containing from 1 to about 20 carbon atoms. The preferred alkenylene radicals are those containing from 2 to about 20 carbon atoms. The preferred cycloalkylene, cycloalkylidene, and cycloalkenylene radicals are those containing from about 4 to about 8 ring carbon atoms. The substituted divalent aliphathic hydrocarbon radicals are those divalent aliphatic hydrocarbon radicals described above which contain at least one substituent group, preferably from one to about three substituent groups. The preferred substituent groups are the halogens, nitro groups, and amino groups.

The aromatic polyesters suitable for use in the instant invention generally contain at least one recurring structural unit of Formula III wherein $R^2$ and $R^3$ are independently selected from divalent aromatic radicals or substituted divalent aromatic radicals. The divalent aromatic radicals represented by $R^2$ and $R^3$ include the phenylene radical, the substituted phenylene radical, the biphenylene radical, the substituted biphenylene radical, the naphthylene radical, the substituted naphthylene radical, and radicals represented by the general formula

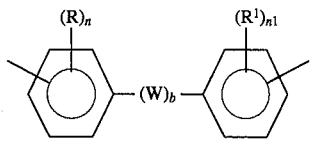

IIIa wherein R, $R^1$, W, n, $n^1$ and b are as defined hereinafore.

Particularly useful aromatic polyesters are those wherein $R^3$ is a phenylene radical and $R^2$ is a radical represented by Formula IIIa.

The aliphatic aromatic polyesters are those wherein one of $R^2$ or $R^3$ is a divalent aromatic radical and one of $R^2$ or $R^3$ is a divalent aliphatic radical. Preferred aliphatic aromatic polyesters are those wherein $R^2$ is a divalent aliphatic radical or substituted divalent aliphatic radical and $R^3$ is a divalent aromatic radical or a substituted divalent aromatic radical.

One class of particularly useful aliphatic aromatic polyesters are the polyalkylene terephthalates or polyalkylene isophthalates. These types of polyesters contain at least one recurring structural unit represented by the general formula

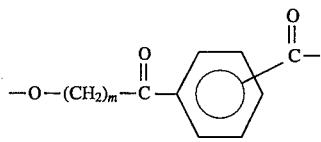

IIIb wherein m is an integer having a value of from 2 to about 4 inclusive. Especially preferred polyesters of Formula IIIb are polyethylene terephthalate and poly(1,4-butylene terephthalate).

Another class of particularly useful aliphatic aromatic polyesters are polyester copolymers or copolyesters which can, without limitation, comprise the reaction products of: (a) a glycol portion comprising 1,4-cyclohexanedimethanol and an acid portion comprising terephthalic acid, isophthalic acid or mixtures thereof; or (b) a glycol portion comprising a 1,4-cyclohexanedimethanol and ethylene glycol wherein the molar ratio of the 1,4-cyclohexanedimethanol to the ethylene glycol in the glycol portion is from about 4:1 to about 1:4, with an acid portion comprising terephthalic acid, isophthalic acid, or mixtures thereof.

These types of copolyesters may be prepared by procedures well known in the art, such as by condensation reactions substantially as shown and described in U.S. Pat. No. 2,901,466, which is hereby incorporated by reference. More particularly, the acid or mixtures of acids or alkyl esters of the aromatic dicarboxylic acid or acids, for example, dimethylterephthalate, together with the dihydric alcohols are charged to a flask and heated to a temperature sufficient to cause condensation of the copolymer to begin, for example 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when an alkyl ester of the dicarboxylic acid is employed, an ester interchange type of catalyst is preferred. If a free acid is being reacted with free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can be advantageously increased with or without the immediate application of vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well known techniques. Thus, the highly monomeric condensation product can be cooled, comminuted, and heated to a temperature below its melting point, thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under greatly reduced pressure.

These copolyesters will generally have an intrinsic viscosity of at least about 0.4 dl/gm as measured in 60/40 phenol/tetrachloroethane or other similar solvents at about 25° C. and will have a heat distortion temperature at 264 p.s.i. from about 60° C. to about 70° C. The relative amounts of the 1,4-cyclohexanedimethanol to ethylene glycol in the glycol portion of the copolyester (b) may vary so long as the molar ratio of 1,4-cyclohexanedimethanol to ethylene glycol is from about 1:4 to 4:1, in order to provide a polyester copolymer having a suitable heat distortion temperature within the recited range, and other suitable properties.

One quite useful type of copolyester is a copolyester of the type described hereinafore wherein the glycol portion has a predominance of ethylene glycol over 1,4-cyclohexanedimethanol, for example greater than about 50/50 and especially preferably is about 70 molar ethylene glycol to 30 molar 1,4-cyclohexanedimethanol, and the acid portion is terephthalic acid. A preferred copolyester of this type is commercially available under the tradename KODAR PETG 6763 from Eastman Chemical Co. A preferred copolyester is one derived from 1,4-cyclohexanedimethanol as the glycol portion and a mixture if isophthalic and terephthalic acids as the acid portion. This type of copolyester is available from Eastman Chemical Co. under the tradename KODAR A150.

Where blends of polycarbonate and polyester are employed herein, the ratios of the polyesters to the polycarbonates may vary widely. Generally, however, compositions which contain from about 5 to about 85 weight percent of the aromatic carbonate resin and from about 85 to about 5 weight percent polyester are preferred, while compositions which contain from about 10 to about 70 weight percent aromatic carbonate resin and from about 70 to about 10 weight percent polyester resin are more preferred. Quite useful compositions are those that contain from about 20 to about 60 weight percent aromatic carbonate resin and from about 60 to about 20 weight percent polyester resin. Weight percent aromatic carbonate resin is based on the total amounts of aromatic carbonate resin and polyester resin present in the compositions. Likewise, weight percent polyester is based on the total amounts of the polyester resins and aromatic carbonate resin present in the instant compositions, i.e., polyester/aromatic carbonate blends.

The polyphenylene ether (PPE) resins are generally well-known in the art, and are described, for example, in U.S. Pat. Nos. 3,306,874; 3,306,875; and 3,432,469 of Allan Hay; U.S. Pat. Nos. 3,257,357 and 3,257,358 of Gelu Stamatoff; U.S. Pat. No. 4,806,602 of Dwain M. White et al.; and U.S. Pat. No. 4,806,297 of Sterling B. Brown et al., all incorporated herein by reference. Both homopolymer and copolymer polyphenylene ethers are within the scope of this invention.

The preferred PPE resins are homo- and copolymers which comprise a plurality of structural units of the formula

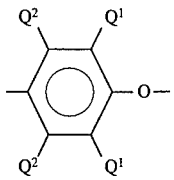

wherein each $Q^1$ is independently halogen, primary or secondary lower alkyl, phenyl, haloalkyl, aminoalkyl, hydrocarbonoxy, or halohydrocarbonoxy, wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl, and the corresponding heptyl groups. Examples of secondary lower alkyl groups are isopropyl, sec-butyl and 3-pentyl. Preferably, any alkyl radicals are straight chain, rather than branched. Often, each $Q^1$ is alkyl or phenyl, especially $C_{1-4}$ alkyl, and each $Q^2$ is hydrogen. Especially preferred polyphenylene ethers will be comprised of units derived from 2,6-dimethyl phenol. Also preferred in some instances are PPE copolymers comprised of units derived from 2,6-dimethyl phenol and 2,3,6-trimethyl phenol.

The PPE resins may contain certain moieties which modify properties such as molecular weight, melt viscosity, or impact strength. For example, vinyl monomers and vinylaromatic compounds may be grafted onto the PPE polymer, as described, for example, in the application of Sterling B. Brown et al., Attorney Docket Number RD-19372, U.S. Ser. No. 351,903, filed May 15, 1989, the entire contents of which are incorporated herein by reference.

As another example, coupled PPE polymers may also be used, in which the coupling agent is reacted with hydroxy groups of two PPE chains to produce a higher molecular weight polymer.

The PPE resins of this invention generally have a weight average molecular weight of about 20,000 to 80,000, as determined by gel permeation chromatography.

Furthermore, they can be prepared by methods known in the art: for example, oxidative coupling of an appropriate monohydroxyaromatic compound in the presence of a catalyst based on copper, manganese, or cobalt.

The preferred thermoplastic resin is a rubber modified monovinylidene aromatic such as a vinyl aromatic-vinyl cyanide-diene rubber graft copolymer.

Rubber modified monovinylidene aromatic resins comprising (a) a rubber modified monovinylidene aromatic graft copolymer and (b) an ungrafted rigid copolymer, are generally prepared by graft polymerization of a mixture of a monovinylidene aromatic monomer and one or more comonomers in the presence of one or more rubbery polymeric substrates. Depending on the amount of rubber present, a separate matrix or continuous rigid phase of ungrafted rigid (co)polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers. Typically, the rubber modified resins comprise the rubber modified graft copolymer at a level of from 5 to 100 percent by weight based on the total weight of the resin, more preferably from 10 to 95 percent by weight thereof, more preferably 20 to 90 percent by weight thereof, and most preferably from 15 to 85 percent by weight thereof; and the rubber modified resin comprises the ungrafted rigid polymer at a level of from 0 to 95 percent by weight based on the total weight of the resin, more preferably from 5 to 90 percent by weight thereof, more preferably from 10 to 80 percent by weight thereof and most preferably from 15 to 85 percent by weight thereof.

Monovinylidene aromatic monomers which may be employed include styrene, alpha-methyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, parahydroxystyrene or methoxystyrene or mixtures thereof. The monovinylidenearomatic monomers utilized are generically described by the following formula:

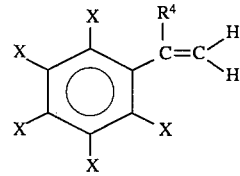

wherein X is selected from the group consisting of hydrogen, alkyl groups of 1 to 5 carbon atoms, cycloalkyl, aryl, alkaryl, aralkyl, alkoxy, aryloxy, and halogens. $R^4$ is selected from the group consisting of hydrogen, alkyl groups of 1 to 5 carbon atoms and halogens such as bromine and chlorine. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Comonomers which may be used with the monovinylidene aromatic monomer includes acrylonitrile, methacrylonitrile, $C_1$ to $C_8$ alkyl or aryl substituted acrylate, $C_1$ to $C_8$ alkyl, aryl or haloaryl substituted methacrylate, acrylic acid, methacrylic acid, iraconic acid, acrylamide, N-substituted acrylamide or methacrylamide, maleic anhydride, maleimide, N-alkyl, aryl or haloaryl substituted maleimide, glycidyl (meth)acrylates, hydroxy alkyl (meth)acrylates or mixtures thereof. The acrylonitrile, substituted acrylonitrile, or acrylic acid esters are described generically by the following formula:

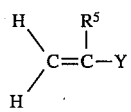

wherein $R^5$ may be selected from the same group set out for $R^4$ as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, α-chloroacrylonitrile, α-bromoacrylonitrile, methyl acrylate, methyl methacrylate, ethyl acrylate, butyl acrylate, propylacrylate, isopropyl acrylate and mixtures thereof. The preferred monomer is acrylonitrile and the preferred acrylic acid esters are ethyl acrylate and methyl methacrylate. It is also preferred that the acrylic acid esters, when included, are employed in combination with styrene or acrylonitrile.

The rubber modified graft copolymer comprises (i) the rubber substrate, and (ii) a rigid polymeric superstrate portion grafted to the rubber substrate. The rubber substrate is preferably present in the graft copolymer at a level of from 5 to 85 percent by weight based on the total weight of the graft copolymer, more preferably from 10 to 80 percent by weight thereof, and most preferably 20 to 70 percent by weight thereof; and the rigid superstrate is preferably present at a level of from 15 to 95 percent by weight based on the total weight of the graft copolymer, more preferably from 20 to 90 percent by weight thereof, and most preferably from 30 to 80 percent by weight thereof.

For high rubber graft emulsion resins, the rubber level will range from 50 to 85% by weight based on the total weight of the rubber modified resin. For mass polymerization, the rubber level ranges from 4 to 40% by weight based on the total weight of the rubber modified resin. For blends of an ungrafted rigid copolymer (such as styrene-acrylonitrile copolymer) with an emulsion high rubber graft (HRG) copolymer (such as acrylonitrile-butadiene-styrene graft copolymers), the rubber loading will typically range from 10 to 40% rubber based on the total weight of the rubber modified resin.

Examples of rubbery polymers for the substrate include: conjugated dienes, copolymers of a diene with styrene, acrylonitrile, methacrylonitrile or $C_1$ to $C_8$ alkyl acrylate which contain at least 50% (preferably at least 65% by weight) conjugated dienes, polyisoprene or mixtures thereof; olefin rubbers i.e. ethylene propylene copolymer (EPR) or ethylene propylene non-conjugated diene (EPDM); silicone rubbers; or $C_1$ or $C_8$ alkyl acrylate homopolymers and/or copolymers with butadiene and/or styrene. The acrylic polymer may also contain up to 5% of one or more polyfunctional crosslinking agents such as alkylenediol di(meth)acrylates, alkylenetriol tri(meth)acrylates, polyester di(meth)acrylates, divinylbenzene, trivinylbenzene, butadiene, isoprene and optionally graftable monomers such as, triallyl cyanurate, triallyl isocyanurate, allyl (meth)acrylate, diallyl maleate, diallyl fumarate, diallyl adipate, triallyl esters of citric acid or mixtures of these agents.

The diane rubbers may preferably be polybutadiene, polyisoprene and copolymers of butadiene with up to 35% by weight of comonomers such as styrene, acrylonitrile, methylmethacrylate or $C_1$–$C_6$-alkylacrylate which are produced by aqueous radical emulsion polymerisation. The acrylate rubbers may be cross-linked, particulate emulsion copolymers substantially of $C_1$–$C_8$-alkylacrylate, in particular $C_2$–$C_6$-alkylacrylate, optionally in admixture with up to 15% by weight of comonomers such as styrene, methylmethacrylate, butadiene, vinyl methyl ether or acrylonitrile and optionally up to 5% by weight of a polyfunctional crosslinking comonomer, e.g. divinylbenzene, glycol-bis-acrylates, bisacrylamides, phosphoric acid triallylester, citric acid triallylester, allylesters of acrylic acid or methacrylic acid, triallylcyanurate, triallylisocyanurate. Also suitable are mixtures of diene- and alkylacrylate rubbers and rubbers which have a so-called core/sheath structure, e.g. a core of diene rubber and a sheath of acrylate or vice versa.

Specific conjugated diene monomers normally utilized in preparing the rubber substrate of the graft polymer are generically described by the following formula:

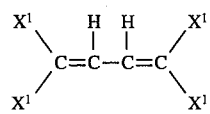

wherein $X^1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion must exhibit a glass transition temperature (Tg) of less than about 0° C.

Mixtures of one or more rubbery polymers previously described for preparing the monovinylidene aromatic graft polymers, or mixtures of one or more rubber modified monovinylidene aromatic graft polymers disclosed herein may also be employed. Furthermore, the rubber may comprise either a block or random copolymer. The rubber particle size used in this invention as measured by simple light transmission methods or capillary hydrodynamic chromatography (CHDF) may be described as having an average particle size by weight of select one of the following: 0.05 to 1.2 microns, preferably 0.2 to 0.8 microns, for emulsion based polymerized rubber latices or 0.4 to 10 microns, preferably 0.4 to 1.5 microns, for mass polymerized rubber substrates which also have included grafted monomer occlusions. The rubber substrate is preferably a particulate, highly crosslinked diene or alkyl acrylate rubber, and preferably has a gel content greater than 70%.

Preferred graft superstrates include copolymers of styrene and acrylonitrile, copolymers of α-methylstyrene and acrylonitrile and methylmethacrylate polymers or copolymers with up to 50% by weight of $C_1$–$C_6$ alkylacrylates, acrylonitrile or styrene. Specific examples of monovinylidene aromatic graft copolymers include but are not limited to the following: acrylonitrile-butadiene-styrene (ABS), acrylonitrile-styrene-butyl acrylate (ASA), methylmethacrylate-acrylonitrile-butadiene-styrene (MABS), acrylonitrile-ethylene-propylene-non-conjugated diene-styrene (AES).

The ungrafted rigid polymers (typically free of rubber) are resinous, thermoplastic polymers of styrene, α-methylstyrene, styrenes substituted in the nucleus such as ρ-methylstyrene, methyl acrylate, methylmethacrylate, acrylonitrile, methacrylonitrile, maleic acid anhydride, N-substituted maleimide, vinyl acetate or mixtures thereof. Styrene/acrylonitrile copolymers, α-methylstyrene/acrylonitrile copolymers and methylmethacrylate/acrylonitrile copolymers are preferred.

The ungrafted rigid copolymers are known and may be prepared by radical polymerisation, in particular by emulsion, suspension, solution or bulk polymerisation. They preferably have number average molecular weights of from 20,000 to 200,000.

The number average molecular weight of the grafted rigid superstrate of the monovinylidene aromatic resin is designed to be in the range of 20,000 to 350,000. The ratio of monovinylidene aromatic monomer to the second and optionally third monomer may range from 90/10 to 50/50 preferably 80/20 to 60/40. The third monomer may optional replace 0 to 50% of one or both of the first and second monomers.

These rubber modified monovinylidene aromatic graft polymers may be polymerized either by mass, emulsion, suspension, solution or combined processes such as bulk-suspension, emulsion-bulk, bulk-solution or other techniques well known in the art. Furthermore, these rubber modified monovinylidene aromatic graft copolymers may be produced either by continuous, semibatch or batch processes.

The compositions preferably contain the flame retardant at a level of from 3 to 40 percent by weight based on the total weight of the composition, more preferably from 7 to 25 percent by weight thereof, and most preferably from 12 to 20 percent by weight thereof.

The flame retardant is a condensation product of a halogenated aromatic diol, preferably brominated aromatic diol, and an alkylene dihalide composition. The brominated aromatic diol is preferably a brominated bisphenol A, and is more preferably tetrabromo bisphenol A. The alkylene dihalide composition is preferably a mixture of a $C_1$–$C_{18}$ (one to eighteen carbon atoms in the alkyl moiety) alkyl monohalide and a $C_1$–$C_{18}$ alkylene dihalide. The $C_1$–$C_{18}$ alkyl monohalide is preferably a $C_1$–$C_4$ alkyl bromide, and more preferably methyl bromide. The $C_1$–$C_{18}$ alkylene dihalide is preferably a $C_1$–$C_4$ alkylene bromide, and more preferably is ethylene dibromide. The alkylene dihalide composition preferably comprises from 5 to 95 percent by weight alkyl monohalide based on the total weight of the alkylene dihalide composition, more preferably from 10 to 40 percent by weight thereof, and most preferably from 20 to 35 percent by weight thereof; and preferably comprises from 5 to 95 percent by weight alkylene dihalide based on the total weight of the alkylene dihalide composition, more preferably from 60 to 90 percent by weight thereof, and most preferably from 65 to 80 percent by weight thereof. The alkyl monohalide and the alkylene dihalide are preferably present in the alkylene dihalide composition in a respective molar ratio of between 1:9 and 2:1, more preferably between 1:5 and 1.5:1, and most preferably between 1:3 and 1:1. The oligomeric flame retardant preferably has a number average molecular weight of between 1000 g/mole and 8000 g/mole, more preferably between 1300 g/mole and 6000 g/mole, and most preferably between 1500 g/mole and 3000 g/mole. The alkyl monohalide is preferably of the formula

$$X^2-R^6$$

wherein $X^2$ is a halogen preferably selected from the group consisting of chlorine and bromine, and most preferably is bromine; and $R^6$ is a (branched or unbranched) $C_1$–$C_{18}$ alkyl radical, preferably a $C_1$–$C_4$ alkyl radical, and is more preferably selected from the group consisting of methyl and ethyl radicals. The alkylene dihalide is preferably of the formula:

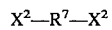

$$X^2-R^7-X^2$$

wherein $X^2$ is as defined above; and $R^7$ is an alkylene divalent radical having from $C_1$–$C_{18}$ carbon atoms, preferably from $C_1$–$C_6$ carbon atoms, and is most preferably selected from the group consisting of ethylene and divalent radicals.

The halogenated aromatic diol, preferably brominated aromatic diol, is more preferably a brominated bisphenol of the formula

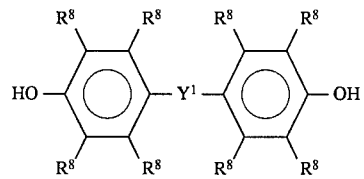

wherein each $R^8$ is independently selected from the group consisting of a hydrogen atom, a chlorine atom, a bromine atom and an alkyl group containing from 1 to 5 carbon atoms provided that at least one $R^8$ group is a chlorine or bromine atom and preferably is a bromine atom; and wherein $Y^1$ represents a single bond or a divalent radical selected from the group consisting of —O—, —S—, —$SO_2$—, —SO—, —CO—, alkylene and alkylidene groups containing 1 to 10 carbon atoms, and oxygen-, silicon-, sulfur- or nitrogen-containing aliphatic hydrocarbon radicals such as —$OR^9O$—, —$OR^9OR^9O$—, —$SR^9S$—, —$SR^9SR^9S$—, $OSiR^9{}_2O$—, —$OSiR^9{}_2OSiR^9{}_2O$—, —$O_2CR^9CO_2$, —$CO_2R^9O_2C$—, —$SOR^9SO$—, —$SO_2R^9SO_2$—wherein $R^9$ is a $C_1$–$C_{10}$ divalent aliphatic hydrocarbon radicals. Preferably at least 4 of the $R^8$ groups of the above diol are bromine. Preferably $Y^1$ is a $C_3$ radical. The preferred brominated bisphenol is tetrabromo bisphenol A, which may be represented by the general formula

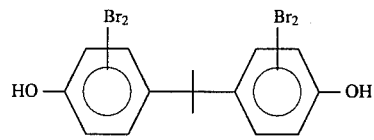

and more preferably

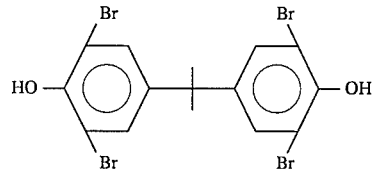

The flame retardant may be represented by the general formula:

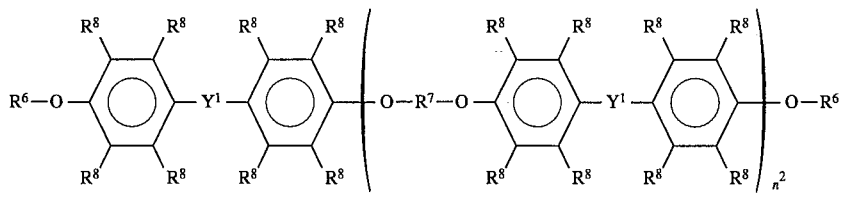

wherein $R^6$, $R^7$ and $R^8$ are defined as above, and $n^2$ is preferably selected from 1 to 12, is more preferably selected from 1 to 5, and is most preferably selected from 2 to 4. The flame retardants may be produced via any suitable condensation reaction including, for example, reaction in the presence of an ether solvent. Note that the flame retardants are end capped with alkyl groups thereby avoiding the problems associated with reactive end groups.

The composition may also contain amounts of a flame retardant synergist. Suitable synergists include antimony compounds, zinc borate, barium, orsanic phosphate, molybdenum components, metaborate, hydrated alumina, zirconium oxide, and ammonium polyphosphate. Suitable antimony compounds include $Sb_2O_3$, $Sb_2S_3$, $K_3Sb$, $Na_3Sb$ and $Li_3Sb$. The amount of synergist in the thermoplastic composition is preferably at a level of from 1 to 15 percent by weight based on the total weight of the composition, more preferably from 2 to 10 percent by weight thereof, and most preferably from 5 to 9 percent by weight thereof.

New York, pages 134, 138 and 774; "Modern Plastics Encyclopedia", 1975–1976, October 1975, Volume 52, No. 10 A, McGraw-Hill, Inc., New York, pages 27, 28 and 472 and U.S. Pat. Nos. 3,671,487, 3,723,373 and 3,838,092.

The following examples illustrate the desirable properties of the present flame retardant in ABS compositions.

EXAMPLES

An ABS graft copolymer composition was produced containing 20.4 parts by weight (pbw) of an oligomer of tetrabromo hisphenol A/methyl bromide/ethylene dibromide condensation product, 9 pbw $Sb_2O_3$, 6 pbw chlorinated polyethylene (CPE), and 100 pbw acrylonitrile-butadiene-styrene graft copolymer. The composition also contained amounts of lubricants and colorants. The flame retardant for example 1 is of the formula:

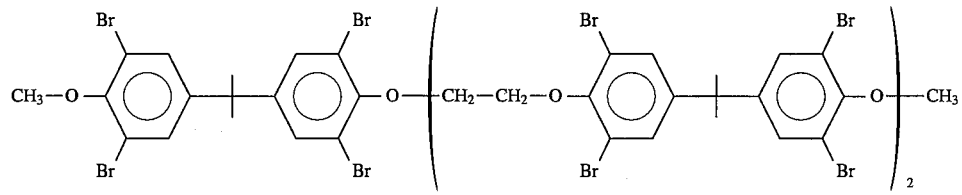

The compositions may also contain an amount of a drip suppressant such as tetrafluoroethylene polymer preferably present at a level of from 0.1 to 5 percent by weight based on the total weight of the composition. Tetrafluoroethylene polymers which are suitable according to the invention have fluorine contents of 65–76% by weight, preferably 70–76% by weight. Examples are polytetrafluoroethylene, tetrafluoroethylene/hexafluoropropylene copolymers, tetrafluoroethylene/1,1-difluoroethylene copolymers, and tetrafluoroeth- The composition of Example 1 exhibited no bloom, a Gardner impact of 25 ft-lb, a notched Izod impact of 4.4 ft-lb/in., a color shift (dE) of only 1.66 at 300 hours in Xenon arc testing, a melt viscosity of 3451 poise at 400° F. at 1000/sec., and a heat distortion temperature of 159° F. at ⅛" and 264 psi, exhibited V0 flame retardancy level at 60 mil, an HPUV of 1.57 at 2806 W-hr/m², and no char on processing.

Example 2 utilized a flame retardant of the formula

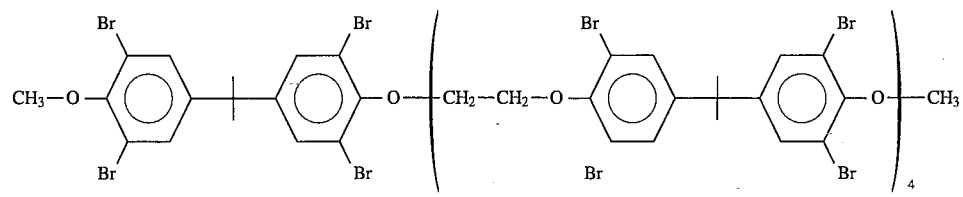

ylene copolymers containing small amounts of fluorine-free copolymerisable ethylenically unsaturated monomers. Such polymers are known from "Vinyl and Related Polymers", John Wiley & Sons, Inc., New York, 1952, pages 484–494; "Fluorpolymers", Wiley-Interscience, New York, 1972; "Encyclopedia of Polymer Science and Technology", Interscience Publishers, New York, Volume 13, 1970, pages 623–654; "Modern Plastics Encyclopedia", 1970–1971, Volume 47, No. 10 A, October 1970 McGraw-Hill, Inc., in an ABS composition, and exhibited good color, no bloom, good ultraviolet light resistance, UV UV(dE)=1.19, UL94 at 60 mil=V0, UL94 at 90 mil V=5 V, notched Izod of 4.1 ft-lb/in., Gardner impact of 18 ft-lb, HDT at ⅛" and 264 psi of 169° F., a melt viscosity of 1000/s at 400° F. of 3559 poise.

Example 3 involved replacement of the ABS in the above composition of example 1 with a high impact polystyrene and yielded a UL-94 of V-2 at 60 mil, and a V0 at 250 mil.

Example 4 involved the replacement of the ABS of example 1 with a bisphenol A polycarbonate/ABS blend, and yielded a UL-94 rating of V-0 at 60 mil, a notched Izod of 9.7 ft-lb/in., and a melt viscosity of 1405 poise at 1000/s and 500° F.

We claim:

1. A vinyl aromatic resin composition comprising from 3 to 40 percent by weight of a flame retardant which is an oligomeric condensation product of a halogenated aromatic diol and an alkylene dihalide composition comprising alkylene dihalide.

2. The composition of claim 1 wherein said composition comprises a vinyl cyanide-diene-vinyl aromatic graft copolymer.

3. The composition of claim 2 wherein said graft copolymer is an acrylonitrile-butadiene-styrene graft copolymer.

4. The composition of claim 1 wherein said flame retardant is the condensation product of tetrabromobisphenol A, methyl bromide and ethylene dibromide.

5. The composition of claim 1 wherein said flame retardant is represented by the general formula:

$$R^6-O-\underset{R^8}{\overset{R^8}{\bigcirc}}-Y^1-\underset{R^8}{\overset{R^8}{\bigcirc}}\left(O-R^7-O-\underset{R^8}{\overset{R^8}{\bigcirc}}-Y^1-\underset{R^8}{\overset{R^8}{\bigcirc}}-O\right)_{n^2}-R^6$$

wherein each $R^6$ is independently a $C_1$ to $C_{18}$ alkyl radical, each $R^8$ is independently selected from the group consisting of bromine, chlorine, hydrogen and $C_1$ to $C_5$ alkyl radicals, provided that at least one $R^8$ of each bisphenol moiety is a bromine, each $R^7$ is a divalent radical selected from the group consisting of divalent radicals having from 1 to 18 carbon atoms, each $Y^1$ is independently selected from the group consisting —O—, —S—, —$SO_2$—, —SO—, —CO—, and alkylene and alkylidene radicals having from 1 to 10 carbon atoms, and $n^2$ is selected from 1 to 12.

6. A flame retardant thermoplastic composition comprising:

(a) a vinyl aromatic resin present at a level of from 60 to 97 percent by weight based on the total weight of the composition, and (b) a flame retardant present at a level of from 3 to 40 percent by weigh based on the total weight of the composition, said flame retardant being of the general formula:

$$CH_3-O-\underset{Br}{\overset{Br}{\bigcirc}}-\underset{Br}{\overset{Br}{\bigcirc}}-O\left(CH_2-CH_2-O-\underset{Br}{\overset{Br}{\bigcirc}}-\underset{Br}{\overset{Br}{\bigcirc}}-O\right)_{n^2}-CH_3$$

wherein $n^2$ is selected from 1 to 12.

7. The composition of claim 6 wherein $n^2$ is selected from 1 to 5.

8. The composition of claim 6 wherein said flame retardant is present at a level of from 7 to 25 percent by weight based on the total weight of the composition.

9. The composition of claim 6 wherein said flame retardant is present at a level of from 12 to 20 percent by weight based on the total weight of the composition.

10. The composition of claim 6 wherein said composition further comprises from 1 to 15 percent by weight of an antimony compound.

11. The composition of claim 1 wherein said composition further comprises from 1 to 15 percent by weight of an antimony compound.

12. The composition of claim 1 further comprising an aromatic polycarbonate resin.

13. The composition of claim 1 further comprising a polyalkylene terephthalate resin.

14. The composition of claim 1 further comprising a polyphenylene ether resin.

15. The composition of claim 1 wherein said flame retardant is an oligomeric condensation product of a brominated aromatic diol and an alkylene dihalide composition comprising an alkyl monohalide and an alkylene dihalide.

16. The composition of claim 1 wherein said vinyl aromatic resin is an impact modified styrene polymer.

17. The composition of claim 1 wherein said oligomeric condensation product is substantially free of reactive end groups.

18. The composition of claim 1 wherein said oligomeric condensation product comprises alkyl end groups.

19. The composition of claim 1 wherein said oligomeric condensation product is an halogenated polyether.

20. The composition of claim 1 wherein said halogenated aromatic diol is a brominated aromatic diol.

21. The composition of claim 1 wherein said oligomeric condensation product has a number average molecular weight of between 1000 g/mole and 8000 g/mole.

22. The composition of claim 1 wherein said oligomeric condensation product has a number average molecular weight of between 1300 g/mole and 6000 g/mole.

23. The composition of claim 1 wherein said oligomeric condensation product has a number average molecular weight of between 1500 g/mole and 3000 g/mole.

24. The composition of claim 3 wherein said oligomeric condensation product comprises alkyl end groups.

25. The composition of claim 5 wherein $n^2$ is from 1 to 5.

26. The composition of claim 15 wherein said alkylene dihalide is from 1 to 18 carbon atoms and said alkyl monohalide is from 1 to 18 carbon atoms.

27. The composition of claim 15 wherein said alkylene dihalide comprises from 5 to 95 percent by weight alkyl monohalide based on the total weight of said alkylene dihalide composition.

* * * * *